Sept. 15, 1953     A. SAMSKY ET AL     2,652,101
ADJUSTABLE HEADREST
Filed Jan. 14, 1952     2 Sheets-Sheet 1
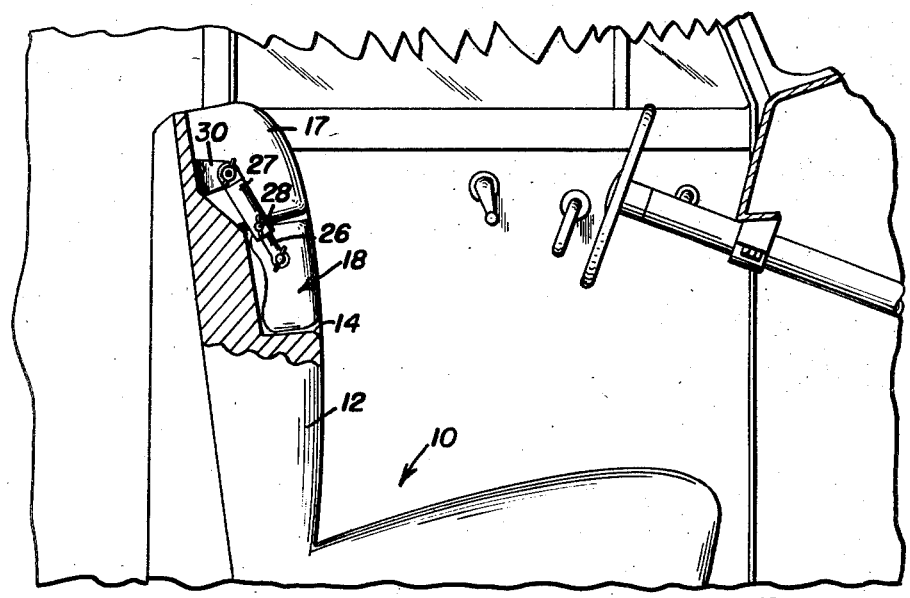
Fig. 1
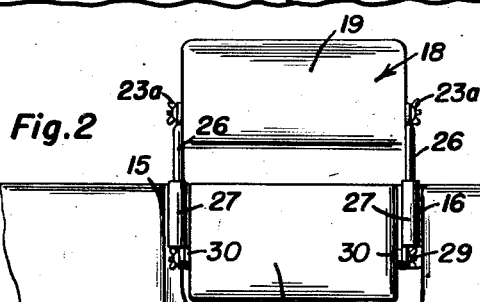
Fig. 2
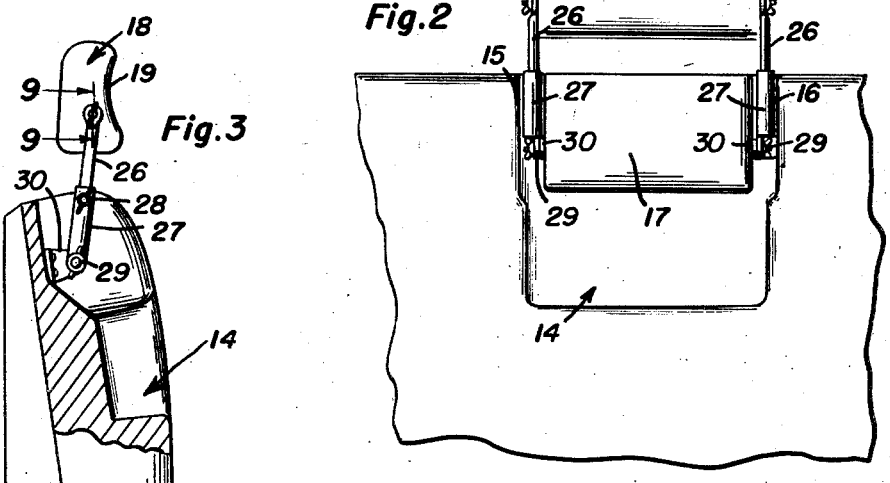
Fig. 3
Fig. 9
Abraham Samsky
Henry M. Houseman
INVENTORS.
BY *(signatures)*
Attorneys Sept. 15, 1953　　　A. SAMSKY ET AL　　　2,652,101
ADJUSTABLE HEADREST
Filed Jan. 14, 1952　　　　　　　　　　　　　　　2 Sheets-Sheet 2
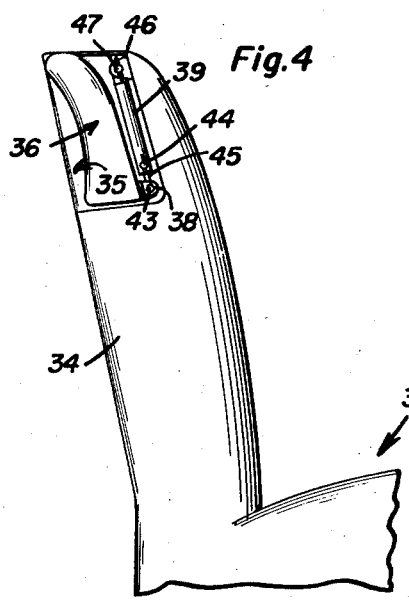
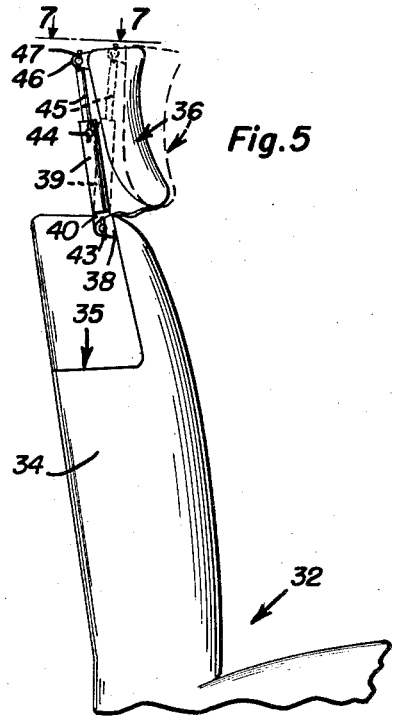
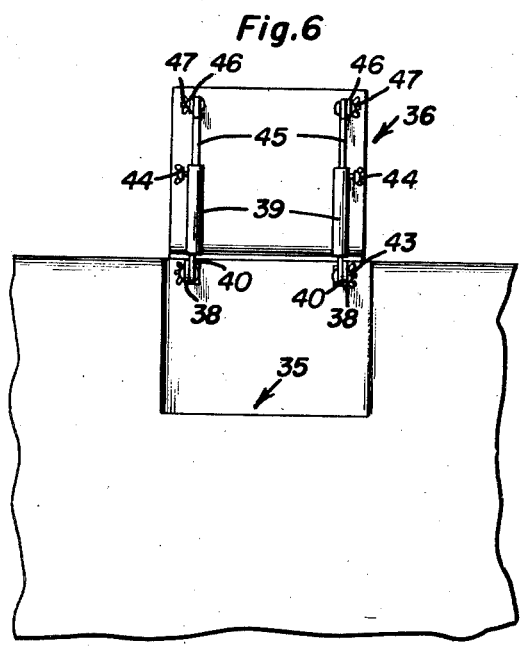
Abraham Samsky
Henry M. Houseman
INVENTORS.
BY
Attorneys Patented Sept. 15, 1953

2,652,101

UNITED STATES PATENT OFFICE 2,652,101

ADJUSTABLE HEADREST

Abraham Samsky and Henry M. Houseman,
Detroit, Mich.

Application January 14, 1952, Serial No. 266,287

6 Claims. (Cl. 155—177)

1

The present invention relates to certain new and useful improvements in automotive vehicle seat constructions and has more particular reference to an upholstered or cushioned seat which is provided with one or more head rests which may be brought into use whenever necessary or desired to enable a user to employ the same for relaxation, particularly when a long drive is being undertaken.

When on a time consuming and long trip automobile, bus and truck drivers are often called upon to stop by the wayside for a deserving rest. Under most such circumstances the driver will be compelled for one reason or another to try to rest in a sitting position. If he slouches down in his seat in order to rest his head and neck against the commonly constructed back rest he soon becomes uncomfortable but has to make the best of it. In these circumstances there has long existed a need for an extensible and contractible head rest, one which may be satisfactorily and aptly brought into play to provide the result desired. It is, therefore, the object of the present invention to provide the back rest of the seat structure with a receiving pocket and to locate the temporarily usable head rest in the pocket in an out-of-the-way position, means being provided whereby said head rest may be lifted out of the pocket and arranged in suitable position for use and then adjusted as to a height and inclination to meet with the requirements of a particular user.

Briefly, the preferred embodiment of the invention is characterized by a seat structure having a backrest with a recess therein providing a receiving pocket for a receding headrest, a headrest occupying an out-of-the-way position in said pocket, and linkage means connected with said backrest and headrest respectively and permitting said headrest to be removed from said pocket to occupy a position above said backrest, whereby to provide a support for the user's head and neck.

In carrying out the preferred principles of the invention the pocket may be located in the obverse or front side of the backrest below the upper edge of the latter so that when the headrest is folded into the pocket, it conforms with adjacent surfaces of the backrest and actually becomes a component of the backrest, in an obvious complemental manner.

Another object of the invention has to do with the utilization of simple and practical linkage devices, these being hinged at their respective lower ends on the backrest and having hinging connections at their upper ends to end portions of the headrest and each device being characterized by a sleeve with a rod telescoping into the

2 sleeve whereby to provide an arrangement which not only permits the headrest to be located in the desired plane above the backrest but permits it to be moved either forwardly or rearwardly and tilted, all with a view toward permitting it to be brought into play for comforting and satisfying use.

Other features and advantages will become more readily apparent from the following description and the accompanying sheet of illustrative drawings.

In the accompanying drawings:

Figure 1 is a view showing a fragmentary portion of a motor truck with a portion of the backrest broken away and shown in sections and further showing the folded headrest in its out-of-the-way position;

Figure 2 is a fragmentary front elevational view of the backrest, looking at Figure 1 in the direction from right to left and showing the headrest extended to a position for use;

Figure 3 is a view based on Figure 1 and also Figure 2 observing the latter in a direction from left to right;

Figure 4 is a fragmentary elevational view showing an automobile seat, of the pleasure-car-type, with the improved headrest folded into a pocket in the rear or reverse side of the backrest;

Figure 5 is a view similar to Figure 4 showing the headrest adjusted to a position for use and also showing, in dotted lines, the manner in which it may be swung either rearwardly or forwardly for best results;

Figure 6 is a fragmentary elevational view of the structure seen in Figure 1 observing the same in a direction from left to right;

Figure 7 is a view looking down on top of the extended head rest, the view being taken approximately on the line 7—7 of Figure 5;

Figure 8 is a fragmentary sectional and elevational view showing certain of the features on a slightly enlarged scale; and, Figure 9 is a fragmentary section on the plane of the line 9—9 of Figure 3, looking in the direction of the arrows.

Reference is had first to the truck seat construction shown in Figures 1, 2 and 3. Here the seat is denoted generally by the numeral 10 and the backrest by the numeral 12. There is a recess or cavity in the obverse or front surface of the backrest below the upper edge of the latter which constitutes the aforementioned headrest receiving pocket. The pocket in the main is denoted by the numeral 14 in Figure 2. It has end branches 15 and 16 opening through the upper edge of the backrest or cushioned portion thereof and leaving a sort of isolated cushion 17 therebetween. The cushioned head rest is denoted by the numeral 18 and is generally rectangular in form and has a suitable concavity 19 for appropriate and restful use. While the headrest may be of some other construction it is preferably as shown in Figure 9, in that it includes a marginal metal or equivalent frame 20, cushion means 21 and a covering 22. In the end member of each frame is a bolt 23 carrying a serrated or toothed washer 24 cooperating with the toothed end portion 25 of a coacting rod 26. The parts are assembled and adjustably mated by way of a wingnut 23a. The rod is one of the members of the two linkage devices at opposite ends of the headrest. With this arrangement the headrest is practically cradled between the respective rods and may be placed at the desired tilt or angle as is obvious. The respective rods telescope into complemental sleeves 27 and are held in place by screw 28. The respective sleeves are hingedly bolted and thus adjustably mounted as at 29 on L-shaped brackets 30 which are suitably attached in the spaces 16 and 15 to the backrest. Thus, the headrest may be situated in an out-of-the-way position in the pocket 14 as best shown in Figure 1, or, it may be extended up for use as shown in Figure 2 and moved forwardly or backwardly and also properly angled for best results.

In the arrangement shown in Figures 4 to 8 the seat structure is denoted generally by the numeral 32 the backrest is denoted at 34. The cavity or pocket is denoted at 35 and it is arranged in the upper reverse side of the backrest where it properly accommodates the suitably shaped and cushioned headrest 36. In this arrangement, L-shaped brackets 46 are mounted on the backrest within the confines of the cavity of pocket and the respective sleeves 39 are provided with extensions 40 which are serrated and secured by bolt and nut means 42 and 43 to the bracket. The sleeves carry set screws 44 which are engageable with the extensible rods 45. The upper ends of the rods are bolted to brackets 46 as at 47, the brackets being mounted on the end portions of the headrest. The manner of extending and folding the headrest will be clear from this description and the accompanying drawings.

A careful consideration of the foregoing description in conjunction with the invention as illustrated in the drawingss will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In combination, a vehicle seat structure embodying a backrest having a recess therein providing a receiving pocket for a liftable and lowerable headrest, a headrest occupying an out-of-the-way position in said pocket, and extensible and contractible individual linkage units pivotally connected with said backrest and headrest respectively and permitting said headrest to be swung from said pocket through an arcuate path so as to occupy a position above said backrest, said headrest being swingably suspended between the upper ends of said units, whereby to provide a readily regulable support for the user's head and neck.

2. The structure defined in claim 1, wherein said pocket is located in the obverse side of said backrest below the upper edge of the latter and wherein said headrest, when pocketed, becomes a flush component of the backrest.

3. The structure defined in claim 1, wherein said pocket is located in the reverse side of said backrest where it opens through the upper edge of said backrest and wherein said headrest is then merely without function until brought into use.

4. The structure defined in claim 1, wherein said linkage means comprises a pair of duplicate stay devices, each being extensible and contractible and having hinging connection with the backrest and headrest respectively, whereby said headrest is foldable into said pocket.

5. The structure defined in claim 4, wherein each stay device comprises a sleeve and a rod slidable in said sleeve and fastening means for the rod carried by said sleeve.

6. In combination, a seat structure having a backrest with a recess therein providing a receiving pocket for a receding headrest, a headrest occupying an out-of-the-way position in said pocket, brackets fastened on said backrest, sleeves hingedly connected to said brackets, rods telescopically slidable in said sleeves, and means hingedly connecting said rods with cooperating end portions of said headrest.

ABRAHAM SAMSKY.
HENRY M. HOUSEMAN.

References Cited in the file of this patent
UNITED STATES PATENTS

| Number | Name | Date |
|---|---|---|
| 1,632,737 | Lane | June 14, 1927 |
| 1,896,477 | Boller | Feb. 7, 1933 |
| 2,466,553 | McDonald | Apr. 5, 1949 |